United States Patent
Erickson et al.

(10) Patent No.: US 6,926,249 B2
(45) Date of Patent: Aug. 9, 2005

(54) PRECISION MODULATING GLOBE VALVE

(75) Inventors: Irving C. Erickson, Rockford, IL (US); Bonnie J. Dickinson, Durand, IL (US); Daniel F. Murphy, Rockford, IL (US); Jerry L. Snyder, Rockford, IL (US)

(73) Assignee: Invensys Building Systems, Inc., Loves Park, IL (US)

( * ) Notice: Subject to any disclaimer, the term of this patent is extended or adjusted under 35 U.S.C. 154(b) by 270 days.

(21) Appl. No.: 10/184,245

(22) Filed: Jun. 28, 2002

(65) Prior Publication Data

US 2004/0000654 A1 Jan. 1, 2004

(51) Int. Cl.$^7$ .......................... F16K 47/00; F16L 55/02
(52) U.S. Cl. .................. 251/122; 251/205; 137/625.3
(58) Field of Search ............................ 251/121, 122, 251/205; 137/625.3

(56) References Cited

U.S. PATENT DOCUMENTS

| | | | |
|---|---|---|---|
| 2,014,314 A | * 9/1935 | Defenbaugh | 251/122 |
| 2,541,176 A | 2/1951 | Rockwell | 251/34 |
| 3,606,911 A | 9/1971 | Keith | 137/269 |
| 4,795,131 A | * 1/1989 | Scarano et al. | 251/63 |
| 5,516,079 A | * 5/1996 | Baumann | 251/61 |
| 5,937,890 A | 8/1999 | Marandi | 137/271 |
| 6,082,405 A | * 7/2000 | Qvarfordh et al. | 137/625.37 |
| 6,276,397 B1 | 8/2001 | Weber et al. | 138/37 |
| 2002/0017327 A1 | 2/2002 | Kawaai et al. | |

FOREIGN PATENT DOCUMENTS

FR 2 082 646 12/1971

* cited by examiner

Primary Examiner—John K. Fristoe, Jr.
(74) Attorney, Agent, or Firm—Andrus, Sceales, Starke & Sawall, LLP

(57) ABSTRACT

A precision modulating globe valve for controlling the flow of a fluid from zero to a maximum flow rate. The valve plug of the globe valve includes at least one flow modulating channel recessed from the outer surface of the valve plug. The outer surface of the valve plug engages a sealing member positioned along the inner surface of the valve port. The sealing member provides a fluid-tight seal between the outer surface of the valve plug and the valve port. The flow modulating channel is recessed from the outer surface of the valve plug from a minimum flow end to a maximum flow end. The radially recessed area of the flow modulating channel increases from the minimum flow end to the maximum flow end, such that as the valve plug moves past the stationary sealing member, an increased flow rate is created through the valve port.

16 Claims, 8 Drawing Sheets

PRECISION MODULATING GLOBE VALVE

FIELD OF THE INVENTION

The present invention relates to a globe valve for the volumetric control of fluid flow through a conduit. More specifically, the present invention relates to a globe valve having a unique valve plug that provides essentially bumpless modulation of fluid flow from the initiation of flow through a maximum stroke.

BACKGROUND OF THE INVENTION

Globe valves typically include a valve plug that is movable toward and away from a valve seat formed in a valve port between a fluid inlet and a fluid outlet. The movement of the valve plug is typically controlled by an actuator, such as a manual handle or some other type of remotely controlled actuation system.

With a typical globe valve, the flow of fluid through the valve is modulated by varying the clearance between the outside diameter of the valve plug and the inside diameter of the valve port. The clearance area between the outside diameter of the valve plug and the inside diameter of the valve port ranges from a minimum to a maximum value. Although a globe valve is able to provide precision flow control over almost the entire range of the plug stroke, limitations exist near the lower end of the flow value.

The limitations of a globe valve at low flow values are primarily due to the fact that the initial flow through a globe valve upon movement of the valve plug away from the valve port occurs around the entire circumferential surface between the valve plug and the valve port. Since both the valve port and the valve plug have diametral tolerances, as the valve plug strokes away from the valve port, the flow of liquid immediately bumps up to some minimum controllable value determined by the combined tolerance of the valve plug and the valve port. Therefore, currently available globe valves cannot provide the desired precision at low flow values and are thus not rated for this use.

The ratio of the full rated flow of a valve to the initial controllable flow is referred to as the valve's "rangeability". The higher the rangeability value, the better the control system can operate to provide the desired fluid flow. Typically, valves in a family designed for low flow rates have the lowest rangeability. When utilizing such a valve, the control system has difficulty in achieving accuracy and stability requirements over the required flow rates, especially at low flow rates.

Accordingly, there is currently a need for a globe valve that provides precise volumetric control at low flow rates and higher rangeability. Additionally, there is a need for a globe valve that substantially eliminates the "bump" at the beginning of fluid flow through the valve to increase the effective rangeability of the valve.

SUMMARY OF THE INVENTION

The present invention relates to a precision modulating globe valve that creates essentially bumpless modulation of fluid flow from the initiation of flow through a maximum stroke. The globe valve of the present invention thereby increases the "rangeability" of the valve by providing more accurate control at low flow rates.

The precision modulating globe valve of the present invention includes a valve plug that is movable along the longitudinal flow axis of a valve port positioned between an inlet passageway and an outlet passageway. Movement of the valve plug within the valve port controls the flow of fluid through the valve port from the inlet of the globe valve to the outlet of the globe valve.

The valve port of the globe valve includes a sealing member, such as an elastomeric O-ring, positioned along the inner wall of the valve port. The sealing member protrudes from the inner wall of the valve port and engages the outer surface of the valve plug when the valve plug is positioned within the valve port. Specifically, the sealing member provides a fluid-tight seal between the outer surface of the valve plug and the valve port to prevent the flow of fluid along the outer surface of the valve plug.

The valve plug generally includes a cylindrical outer surface sized to be received within the valve port. The valve plug includes at least one flow modulating channel recessed from the outer surface of the valve plug. The flow modulating channel provides a flow path for fluid to pass between the sealing member in the valve port and the valve plug.

The flow modulating channel extends from a minimum flow end to a maximum flow end. The flow modulating channel is constructed such that the cross-sectional area of the flow modulating channel recessed from the otherwise cylindrical outer surface of the valve plug increases from the minimum flow end of the channel to the maximum flow end of the channel. In this manner, as the valve plug is moved relative to the stationary sealing member positioned in the valve port from a closed position to a fully open position, fluid flow from the inlet passageway to the outlet passageway increases.

In a first embodiment of the invention, the flow modulating channel includes a flat face surface recessed from the outer surface of the valve plug. The flat face surface is angled inward such that the flow modulating channel increases in both depth and width from the minimum flow end to the maximum flow end. Alternatively, the flow modulating channel can increase in only width or in only depth relative to the outer surface of the valve plug from the minimum flow end to the maximum flow end. In each case, the recessed radial cross-sectional area of the flow modulating channel increases from the minimum flow end to the maximum flow end of the channel.

The valve plug further includes a sealing ring that contacts a seat formed on the valve port to further aid in preventing fluid flow when the valve plug is in the fully closed position. The sealing ring formed on the valve plug is not required, but further aids in preventing fluid flow when the valve plug is in the completely closed position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
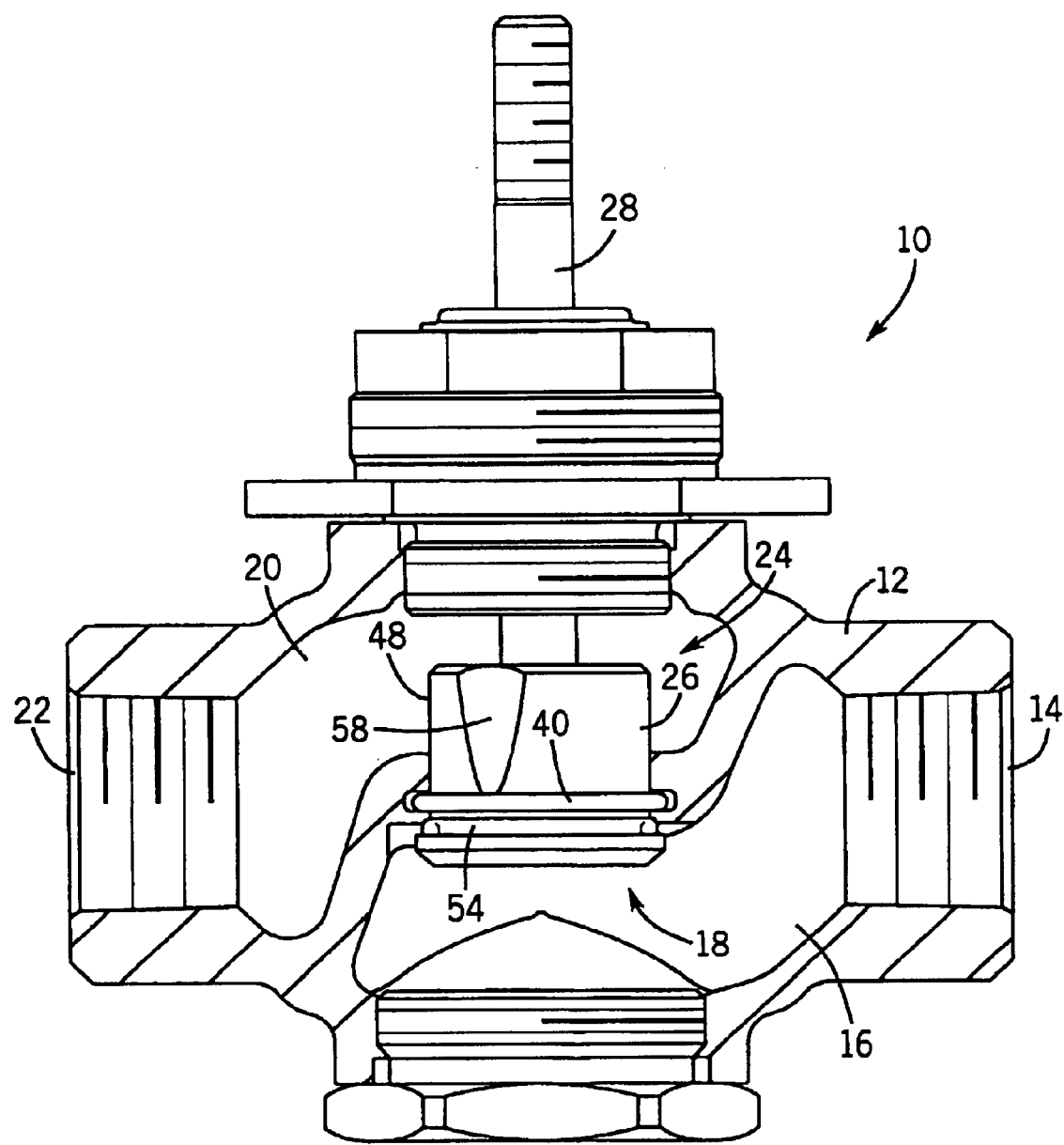
FIG. 1 is a partial section view of the precision modulating globe valve of the present invention utilizing a valve plug having at least one flow modulating channel.
Figure 2:
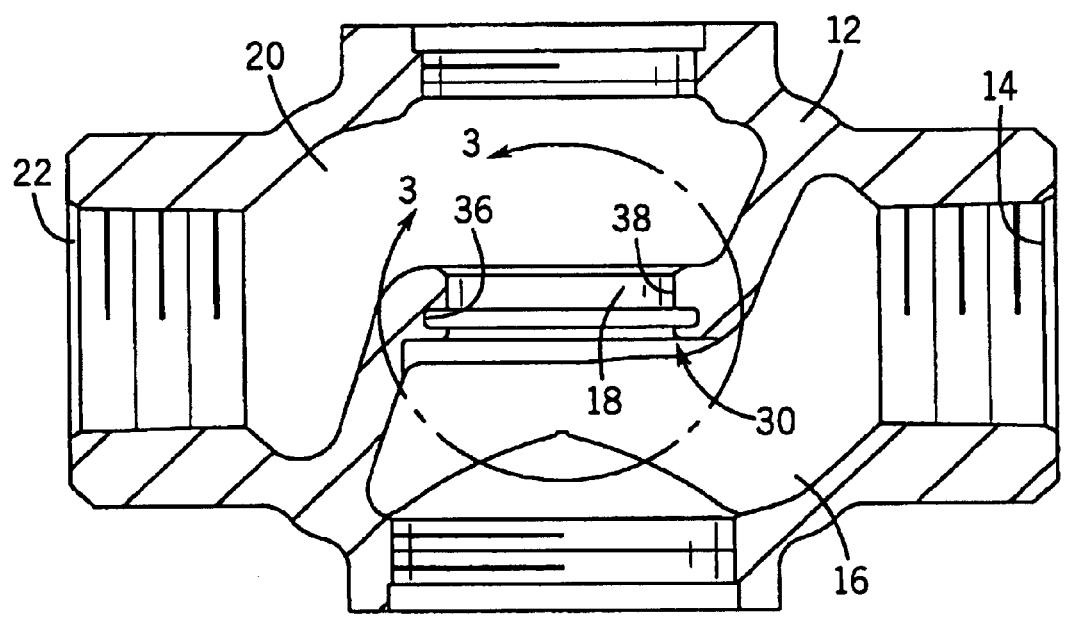
FIG. 2 is a magnified section view illustrating the valve port between the inlet and the outlet of the precision modulating globe valve.

A modulating plug-type control valve, or globe valve, 10 of the present invention is generally illustrated in FIG. 1. The globe valve 10 includes a valve body 12 that defines an inlet opening 14 for receiving a flow of fluid. The inlet opening 14 delivers a flow of fluid to an inlet passageway 16 that is in fluid communication with a valve port 18. The valve port 18 extends along a longitudinal flow axis and provides fluid communication between the inlet passageway 16 and an outlet passageway 20. The outlet passageway 20 allows fluid to flow out of an outlet opening 22. Although not shown in FIG. 1, it is contemplated that the globe valve 10 could also be a three-way mixing valve.

The globe valve 10 includes a valving assembly 24 that controls the flow of fluid through the valve port 18 from the inlet passageway 16 to the outlet passageway 20. Specifically, the valving assembly 24 includes a valve plug 26 coupled to a valve stem 28 such that the valve plug 26 is movable along the longitudinal axis of the valve port 18 between a fully open position (FIG. 14b) and a fully closed position (FIG. 1), as will be described in greater detail below.

The valve body 12 and the globe valve 10 of the present invention are particularly suitable for controlling the flow of a fluid, such as steam, water or air, in a hydronic HVAC system (not shown), although other uses are contemplated as being within the scope of the present invention.

Figure 3:
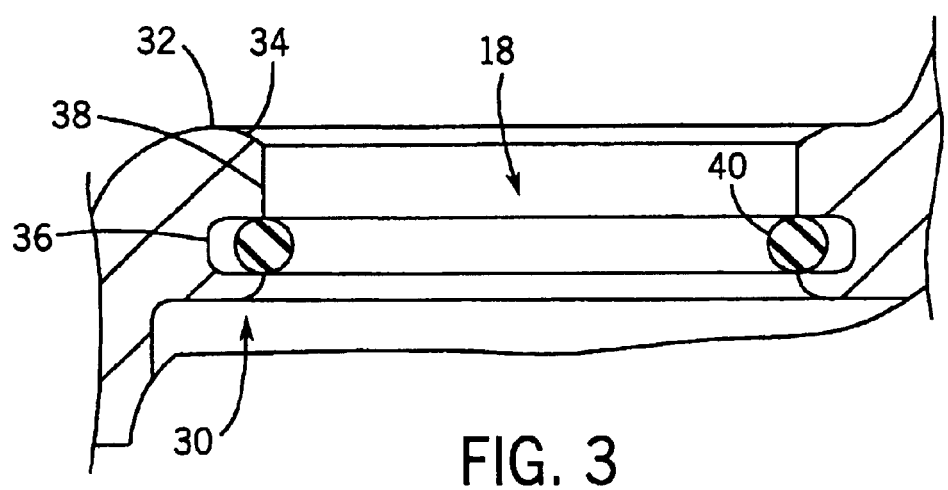
FIG. 3 is a further magnified view taken along line 3—3 of FIG. 2 illustrating the valve port and inserted sealing member.

Referring now to FIG. 3, the valve port 18 includes a valve seat 30 that varies in diameter radially inward from an outer edge 32 to an inner edge 34. The valve seat 30 defines the surface that receives a portion of the valve plug, as will be described in greater detail below.

The valve port 18 further includes a channel 36 that is recessed from the otherwise cylindrical inner wall 38. The channel 36 extends around the entire cylindrical inner wall 38 and is sized to receive a sealing member 40. In the preferred embodiment of the invention, the sealing member 40 is an elastomeric O-ring having a thickness slightly larger than the width of the channel 36. As can be seen in FIG. 3, the sealing member 40 protrudes radially inward from the cylindrical inner wall 38 such that when the valve plug moves through the valve port 18, the sealing member 40 contacts the outer surface of the valve plug and is compressed between the valve plug and the valve port 18 to provide a seal therebetween.

Figure 4:
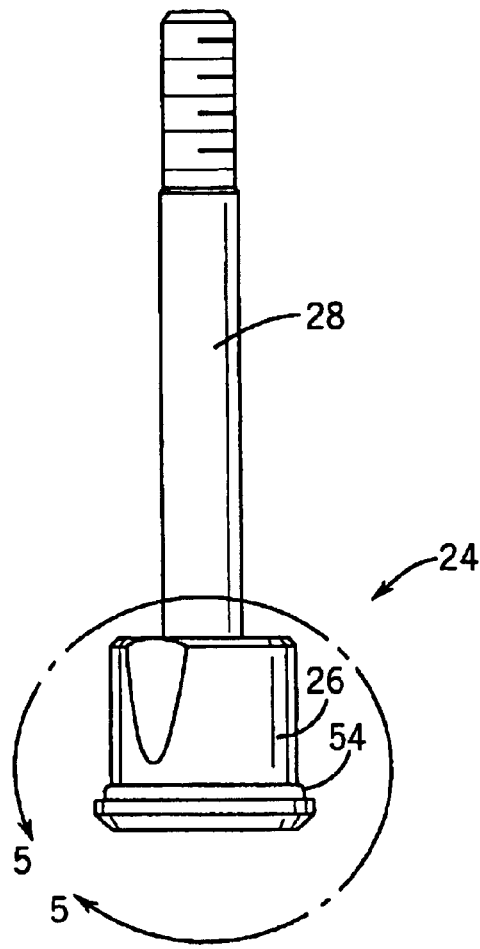
FIG. 4 is a front view of the valve plug and attached valve stem used to move the valve plug between an open position and a closed position.

Referring now to FIG. 4, thereshown is the valving assembly 24 of the present invention. As discussed, the valving assembly 24 includes a valve plug 26 secured to a valve stem 28. As shown in FIG. 1, the valve plug 26 is positioned within the valve port 18 to control the flow of fluid through the valve port 18.

Figure 5:
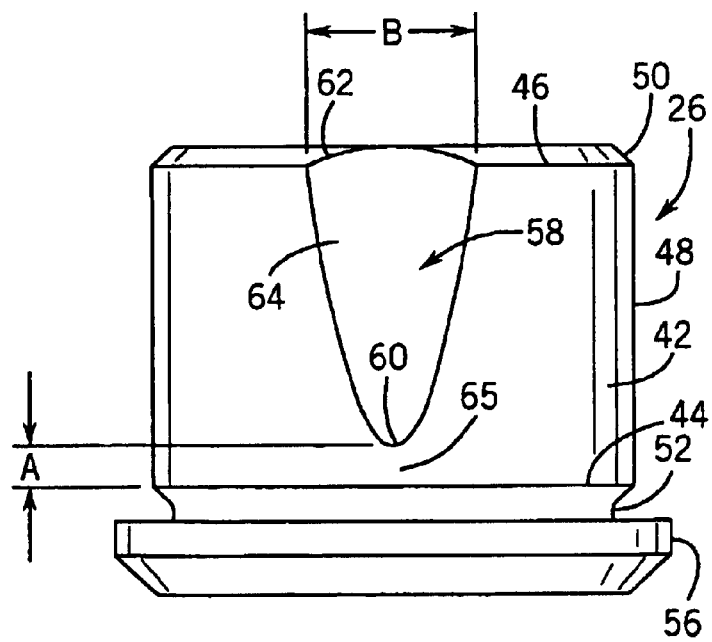
FIG. 5 is a magnified view taken along line 5—5 of FIG. 4 illustrating one of the flow modulating channels formed on the outer surface of the valve plug.

Referring now to FIG. 5, the valve plug 26 is a generally cylindrical member having a main body 42 extending along a longitudinal axis between a first end 44 and a second end 46. Specifically, the main body 42 is defined by a cylindrical outer surface 48 having constant diameter from the first end 44 to the second end 46. The second end of the valve body 26 includes a tapered edge surface 50.

Figure 7:
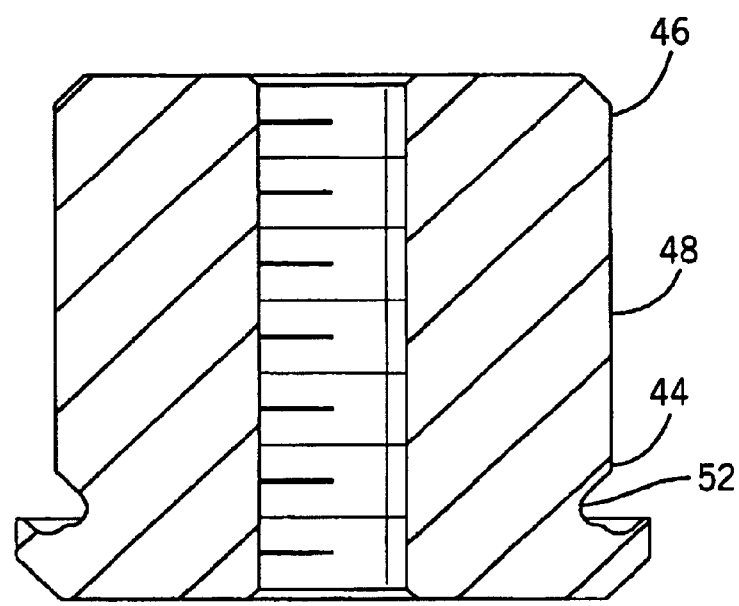
FIG. 7 is a section view taken along line 7—7 of FIG. 6.
Figure 8:
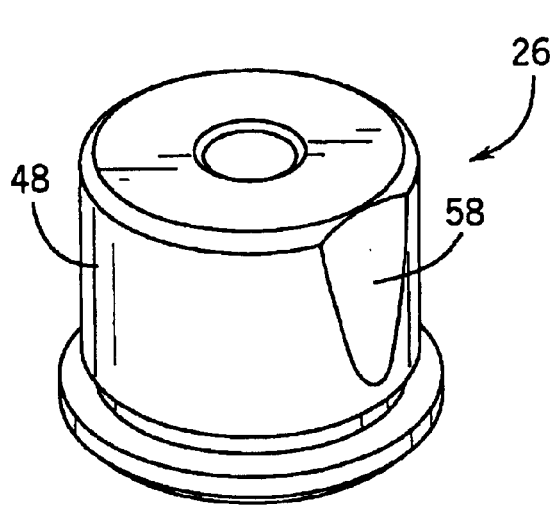
FIG. 8 is a perspective view illustrating a valve plug having a single flow modulating channel.

The first end 44 of the valve body is positioned adjacent to a recessed channel 52. The recessed channel 52, as can be clearly seen in FIG. 7, is sized to receive a sealing ring 54, as shown installed in FIG. 4.

Referring back to FIG. 5, the recessed channel 52 is positioned between the first end 44 and an expanded diameter end cap 56. The end cap 56 has a diameter slightly larger than the diameter of the valve port 18 to prevent the passage of the valve plug through the valve port 18. In the preferred embodiment of the invention, the entire valve plug 26 is formed from metal, although other materials are contemplated.

As can be seen in FIG. 1, the sealing member 40, when positioned in the channel 36 of the valve port 18, contacts the outer surface 48 of the valve plug 26 to prevent the flow of fluid past the valve plug 26. The flexible properties of the sealing member 40 compensates for tolerance variations between the valve port 18 and the outer surface of the valve plug 26.

Figure 14A:
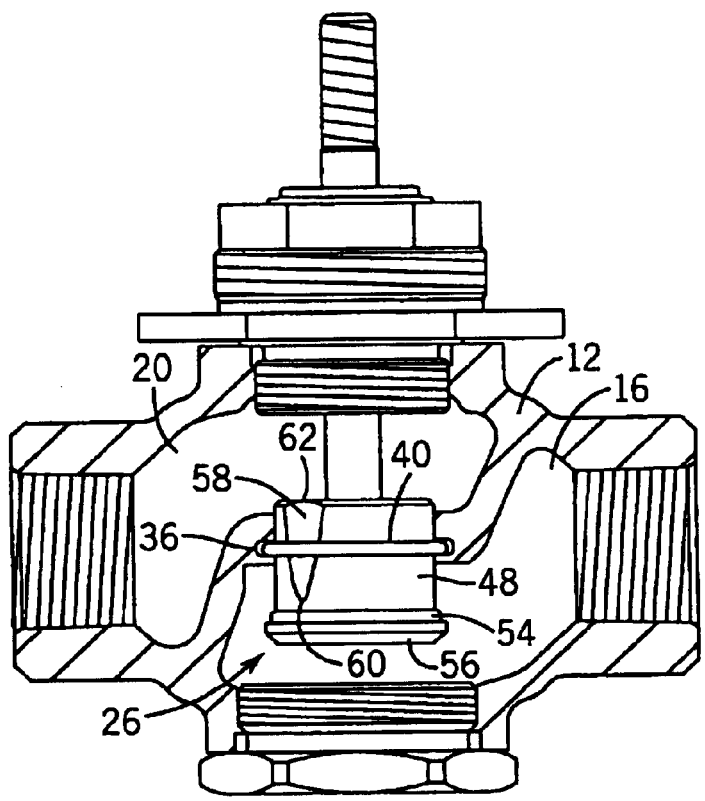
FIG. 14a is a partial section view illustrating the valve plug in a partially open position in which fluid can flow past the sealing member through the flow modulating channel of the valve plug.

Referring back to FIG. 5, the valve plug 26 includes at least one flow modulating channel 58 formed along the outer surface 48 of the valve plug 26. The flow modulating channel 58 is radially recessed from the otherwise cylindrical outer surface 48 such that the flow modulating channel 58 allows fluid to pass between the sealing member 40 and the outer surface 48 of the valve plug when the valve plug 26 moves from the fully closed position (FIG. 1) to a partially open position, as illustrated in FIG. 14a.

In accordance with the preferred embodiment shown, the only flow from the inlet passageway 16 to the outlet passageway 20 through the valve port 18 is through the flow modulating channel 58. The flow modulating channel 58 provides for a controlled and accurate flow rate as compared to a typical globe valve in which the flow of fluid is controlled by the diametrical flow around the outer surface of the valve plug.

Figure 6:
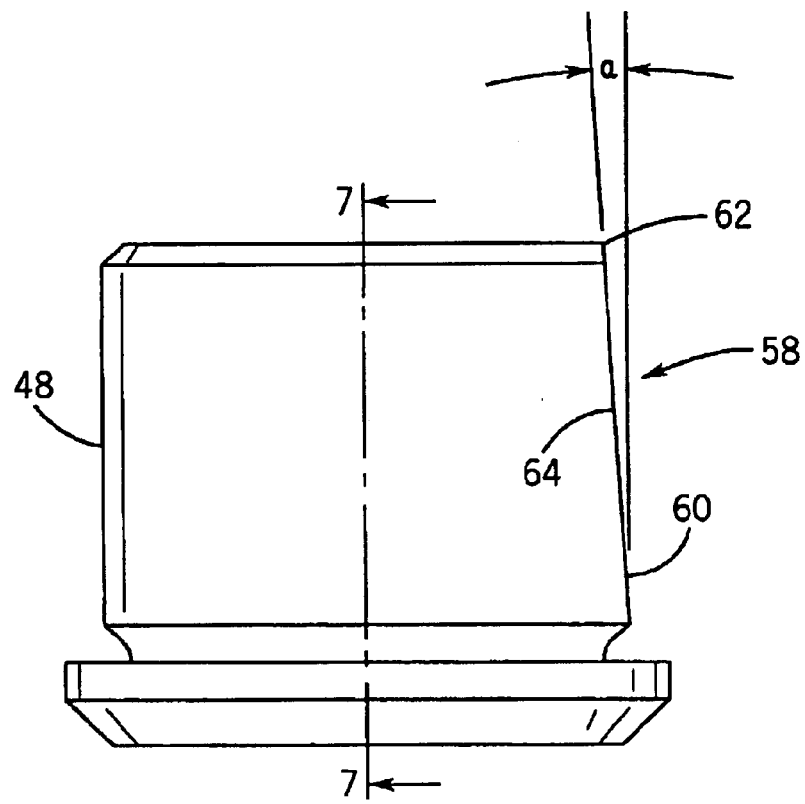
FIG. 6 is a side view of the valve plug illustrating the recessed flow modulating channel.

As can be seen in FIGS. 5 and 6, the flow modulating channel 58 extends from a minimum flow end 60 to a maximum flow end 62. As illustrated in FIGS. 5 and 6, the distance A between the minimum flow end 60 of the channel 58 and the first end 44 of the main body 42 defines a sealing area 65. The width A of the sealing area 65 is selected such that the sealing member 40 can engage the entire outer surface 48 of the valve plug 26 in the completely closed position. When the valve plug 26 is in the completely closed position, as shown in FIG. 1, the sealing member 40 prevents the flow of fluid along the outer surface 48 of the valve plug 26.

In the embodiment of the invention illustrated in FIGS. 5 and 6, the flow modulating channel 58 includes a flat face surface 64 that increases in width from the minimum flow end 60 to the maximum flow end 62. As illustrated, the maximum flow end 62 has a width B. In the embodiment of the invention illustrated, the width of the channel B is 0.252" while the diameter of the valve plug is 0.70"

As illustrated in FIG. 6, the back face surface 64 is angled radially inward relative to the outer surface 48 at an angle α. In the preferred embodiment of the invention, the angle α is 3°, although other angles are contemplated depending on the range of flow rates required. Thus, both the width B and the depth of the flow modulating channel 58 increase from the minimum flow end 60 to the maximum flow end 62.

Although the flow modulating channel 58 shown in FIGS. 5 and 6 increases in both width and depth, it is significant that the radial cross-sectional area of the flow modulating channel that is recessed from the outer surface 48 increase from the minimum flow end 60 to the maximum flow end 62. The increase in the radially cross-sectional area of the flow modulating channel 58 can be created by increasing the width of the flow modulating channel, increasing the depth of the flow modulating channel, or a combination of the two. In each case, the radial cross-sectional area of the flow modulating channel 52 that is recessed from the outer surface 48 controls the amount of fluid that can flow past the sealing member 40 in the valve port.

Figure 14B:
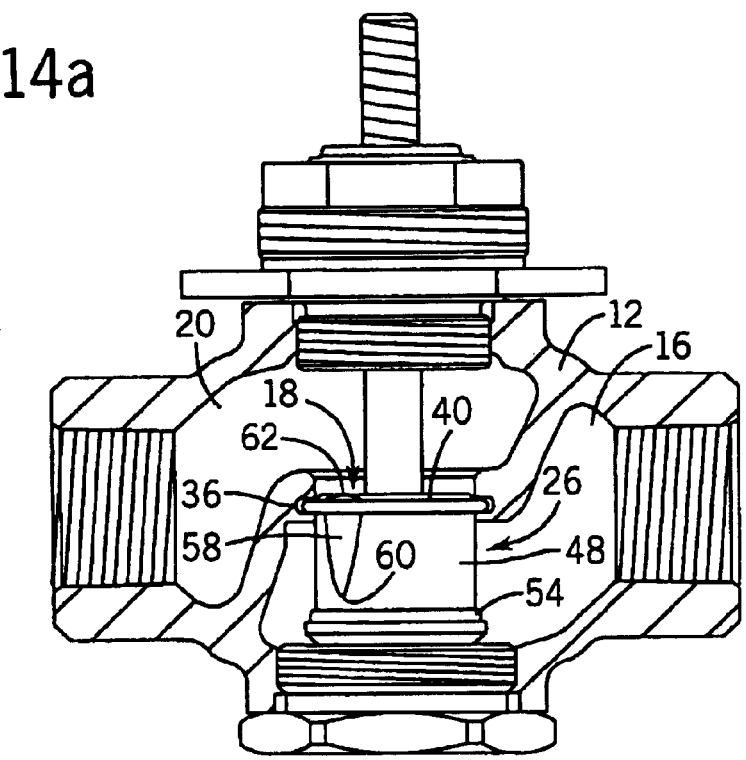
FIG. 14b is a partial section view illustrating the valve plug in a fully open position.

As the valve plug 26 moves from the closed position shown in FIG. 1 to an open position shown in FIG. 14b, the valve plug 26 moves downwardly along the longitudinal axis of the valve port 18 relative to the stationary sealing member 40. As the valve plug 26 moves in such direction, the minimum flow end 60 of the flow modulating channel 58 passes beneath the sealing member 40. As the valve plug 26 continues to move, the flow modulating channel 38 creates an increasing gap between the sealing member 40 and the outer surface 48 of the valve plug 26. The increasing open area between the flow modulating channel 58 and the sealing member 40 from the minimum flow end 60 to the maximum flow end 62 allows the flow rate of fluid to increase as the valve plug 26 moves from the closed position to the fully open position.

Referring back to FIG. 1, when the valve plug 26 is in its closed position, the sealing ring 54 positioned in the valve plug 26 contacts the valve seat 30 to further prevent the flow of fluid past the valve plug 26. However, it should be understood that the sealing ring 54 is not required in accordance with the present invention, since the sealing member 40 provides the required seal around the outer surface of the valve plug 26 to prevent the flow of fluid when the valve plug 26 is in its closed position.

Referring now to FIGS. 8–11, thereshown are various valve plugs 26 used to provide different flow rates between the inlet flow passageway and the outlet flow passageway. In the embodiment illustrated in FIG. 8, a single flow modulating channel 58 is formed along the outer surface 48. For illustrative and comparative purposes only, a globe valve utilizing this valve plug may be capable of flow rate near 0.10 $C_v$.

Figure 9:
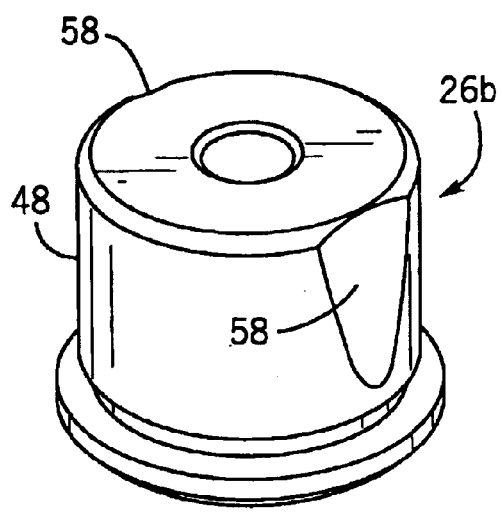
FIG. 9 is a perspective view of a valve plug having two flow modulating channels.

FIG. 9 illustrates a valve plug 26a having a pair of flow modulating channels 58 positioned 180° from each other along the outer surface 48. The valve plug 26 illustrated in FIG. 9 is capable of flow rates near 0.20 $C_v$, double the flow rate possible with the valve plug 26 of FIG. 8.

Figure 10:
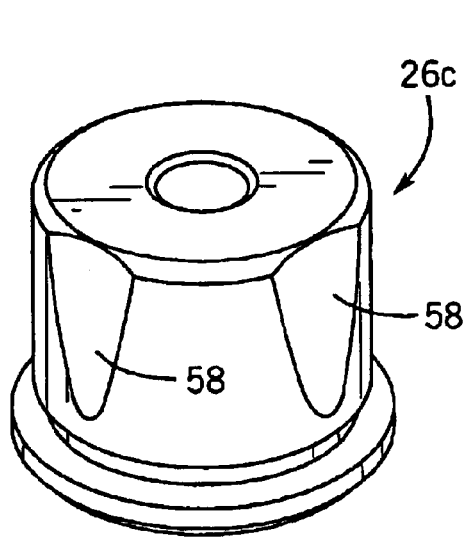
FIG. 10 is a perspective view of a valve plug having four flow modulating channels.

FIG. 10 illustrates a valve plug 26c having four flow modulating channels 58, each positioned 90° from each other. The valve plug 26c illustrated in FIG. 10 allows for flow rates near 0.40 $C_v$, four times the flow rate of the design illustrated in FIG. 8.

Figure 11:
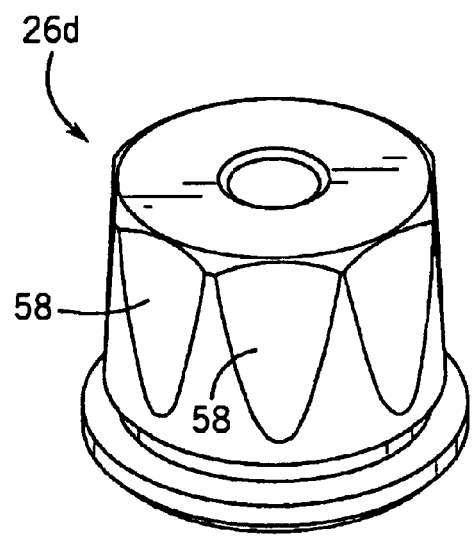
FIG. 11 is a perspective view illustrating a valve plug having eight modulating flow channels.

FIG. 11 illustrates a valve plug 26d having eight flow modulating channels 58. The flow modulating channels 58 shown in FIG. 11 allow the valve plug 26d to create a rating of 0.80 $C_v$, which is eight times the flow rate of the valve plug 26 shown in FIG. 8. As can be understood by the above description, increasing the number of flow modulating channels 58 along the outer surface 48 of the valve plug 26 increases the flow rating of the valve plug 26. The number of flow modulating channels 58 is dictated by the size of the flow modulating channels and the diameter of the valve plug, as can be understood.

Figure 12:
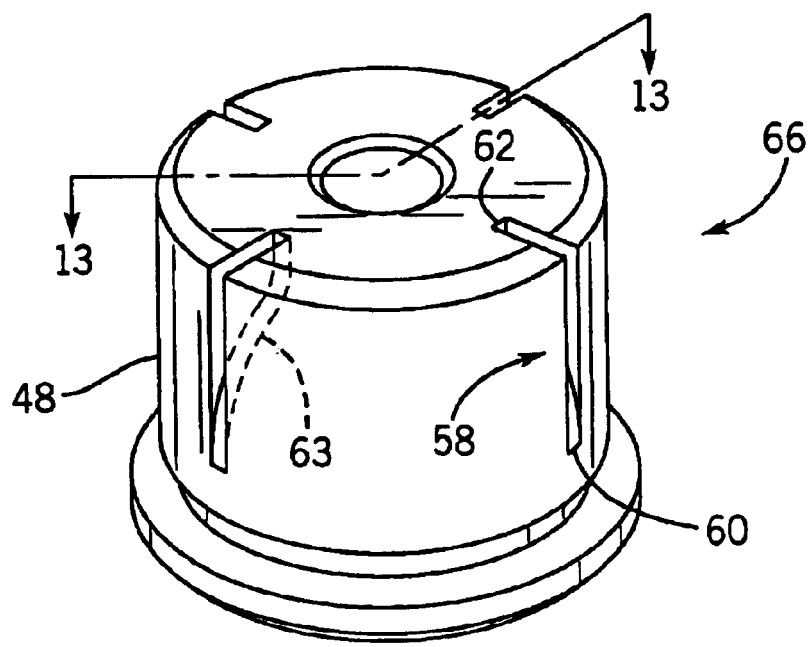
FIG. 12 is a perspective view of an alternate embodiment of the valve plug of the present invention.

Referring now to FIG. 12, thereshown is an alternate configuration for the valve plug, as referred to by reference numeral 66. The valve plug 66 shown in FIG. 12 includes at least four flow modulating channels 58 formed in the otherwise cylindrical outer surface 48. In the embodiment of the invention illustrated in FIG. 12, the flow modulating channels 58 are each a slot having a constant width extending from the minimum flow end 60 to the maximum flow end 62. Like the embodiment illustrated in FIGS. 5 and 6, the recessed radial cross-sectional area of the flow modulating channel 58 increases from the minimum flow end 60 to the maximum flow end 62. In the embodiment of FIG. 12, the depth of the flow modulating channels 58 is defined by a recessed back surface 63 and increases from the minimum flow end 60 to the maximum flow end 62.

Figure 13:
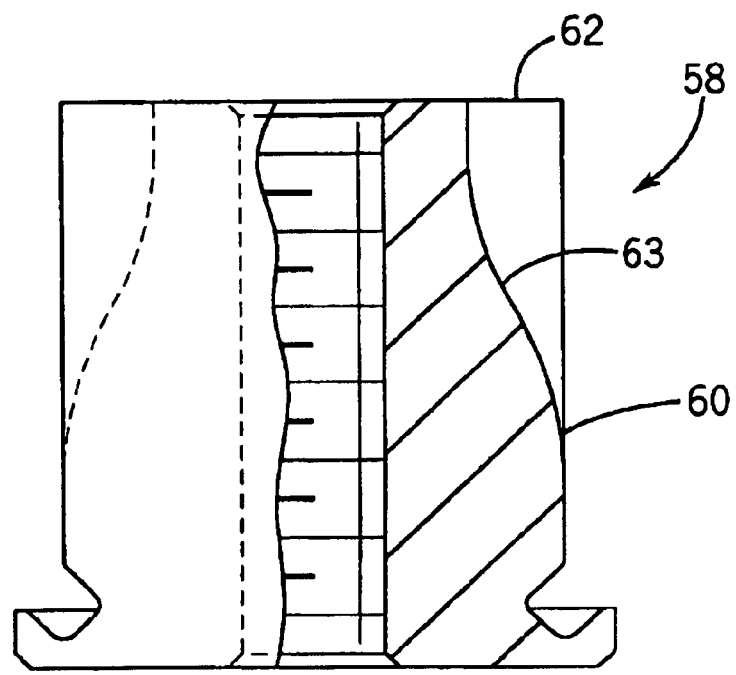
FIG. 13 is a section view taken along line 13—13 of FIG. 12.

Referring now to FIG. 13, the depth of the flow modulating channel 58, as defined by the back surface 63, increases from the minimum flow end 60 to the maximum flow end 62. In the embodiment of FIG. 12, the flow modulating channel 58 is machined into the outer surface 48. The increasing depth of the flow modulating channel 58 provides similar flow rates to the embodiment of FIG. 5, since the recessed area of the flow modulating channel 58 increases at nearly the same rate as the increase in the recessed area of the embodiment illustrated in FIG. 5.

In addition to the embodiments discussed and shown in the Figures, it is contemplated by the inventors that another alternate embodiment could be constructed in which the flow modulating channel 58 has a constant depth and an increasing width from the minimum flow end to the maximum flow end. In such a case, the cross-sectional area of the flow modulating channel would again increase from the minimum flow end to the maximum flow end.

Figure 15:
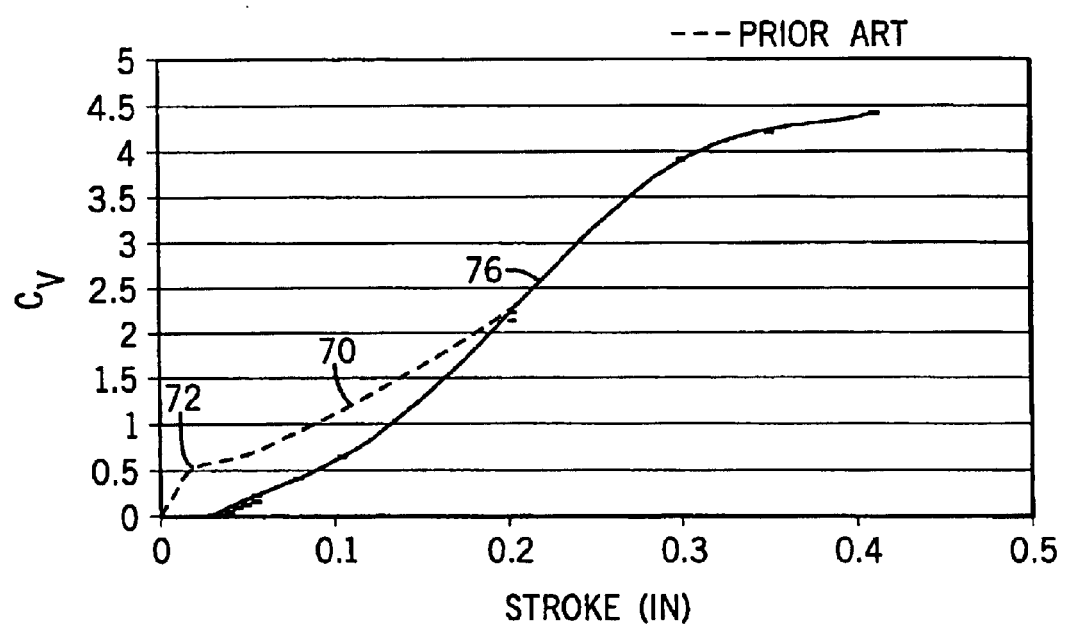
FIG. 15 is a graphic depiction of the flow characteristics of the precision modulating flow valve of the present invention and a prior art globe valve.

FIG. 15 illustrates the flow characteristics of a prior art flow valve and the precision modulating globe valve of the present invention. As illustrated, the prior art globe valve, represented by the broken line 70, has a distinct bump in flow rate at a very low stroke distance, as illustrated by the dashed line between zero and the reference numeral 72. In the prior art globe valve, the valve is typically rated for flow rates illustrated by point 72. Thus, the rangeability of the prior art valve was determined by the minimum flow characteristic of approximately 0.5 $C_v$ to a maximum flow of 4.4 $C_v$.

The solid line 76 illustrates the flow characteristics of the precision modulating globe valve of the present invention.

As illustrated in FIG. 15, the flow characteristics extend well below 0.5 $C_v$ such that the rangeability of the valve has been effectively increased. The increased rangeability provides for more precision flow modulation at lower $C_v$ rates.

Various alternatives and embodiments are contemplated as being within the scope of the following claims particularly pointing out and distinctly claiming the subject matter regarded as the invention.

We claim:

1. A globe valve providing a predetermined variable flow rate of fluid therethrough, the valve comprising:
   a valve housing having an inlet flow passageway and an outlet flow passageway;
   a valve port positioned within the valve housing between the inlet flow passageway and the outlet flow passageway, wherein the valve port defines a longitudinal flow axis between the inlet flow passageway and the outlet flow passageway;
   a valve plug movable along the longitudinal flow axis between an open position and a closed position to control the flow rate of fluid through the valve port, the valve plug having an outer surface extending along a longitudinal axis between a first end and a second end;
   at least one flow modulating channel recessed from the outer surface of the valve plug, wherein fluid flows through the valve port from the inlet flow passageway to the outlet flow passageway only through the flow modulating channel as the valve plug is moved between the closed position and the open position;
   a sealing member positioned along an inner surface of the valve port and sized to engage the outer surface of the valve plug, wherein the sealing member prevents the flow of liquid between the outer surface of the valve plug and the valve port; and
   a sealing ring mounted to the valve plug and positioned the first end of the valve plug, wherein the sealing ring engages the valve port to prevent the flow of fluid past the sealing ring when the valve plug is in the closed position.

2. The valve of claim 1 wherein the flow modulating channel extends from a minimum flow end to a maximum flow end, wherein the cross-sectional area of the flow modulating channel recessed from the outer surface of the valve plug increases from the minimum flow end to the maximum flow end.

3. The valve of claim 2 wherein the depth of the flow modulating channel from the outer surface of the valve plug increases from the minimum flow end to the maximum flow end.

4. The valve of claim 2 wherein the width of the flow modulating channel increases from the minimum flow end to the maximum flow end.

5. The valve of claim 2 wherein both the width of the flow modulating channel and the depth of the flow modulating channel from the outer surface of the valve plug increase from the minimum flow end to the maximum flow end.

6. The valve of claim 2 wherein the valve plug includes a plurality of flow modulating channels formed along the outer surface of the valve plug.

7. The valve of claim 2 wherein the minimum flow end of the flow modulating channel is spaced from the first end of the valve plug such that the sealing member engages the outer surface of the valve plug adjacent to the first end to prevent the flow of liquid through the valve port when the valve plug is in the closed position.

8. The valve of claim 7 wherein the depth of the flow modulating channel from the outer surface of the valve plug increases from the minimum flow end to the maximum flow end.

9. The valve of claim 7 wherein the width of the flow modulating channel increases from the minimum flow end to the maximum flow end.

10. The valve of claim 7 wherein both the width of the flow modulating channel and the depth of the flow modulating channel from the outer surface of the valve plug increase from the minimum flow end to the maximum flow end.

11. The valve of claim 7 wherein the valve body includes a plurality of flow modulating channels formed along the outer surface of the valve plug.

12. The valve of claim 1 wherein the sealing member is an elastomeric ring mounted in the valve port and sized to engage the outer surface of the valve plug and form a seal along the outer surface as the valve plug moves relative to the elastomeric ring.

13. The valve of claim 1 wherein as the valve plug moves from the closed position to the open position, the flow modulating channel moves past the sealing member from the minimum flow end to the maximum flow end.

14. A valve plug for use in controlling the flow of a fluid through a valve port, the valve plug comprising:
   a generally cylindrical outer surface extending along a longitudinal axis from a first end to a second end, the outer surface sized to engage the valve port to prevent fluid flow along the outer surface of the valve plug as the valve plug moves between an open position and a closed position; and
   at least one flow modulating channel recessed from the outer surface of the valve plug, wherein fluid flows along the longitudinal axis of the valve plug only through the flow modulating channel,
   wherein the flow modulating channel extends from a minimum flow end to a maximum flow end, wherein and the depth of the flow modulating channel increases from the minimum flow end to the maximum flow end and the width of the flow modulating channel is constant from the minimum flow end to the maximum flow end.

15. The valve plug of claim 14 wherein the valve plug comprises a plurality of flow modulating channels formed along the outer surface of the valve plug.

16. The valve plug of claim 14 further comprising a sealing ring mounted to the valve plug and positioned between the minimum flow end of the flow path and the first end of the valve plug, wherein the sealing ring contacts the valve port when the valve plug is in its closed position.

* * * * *